UNITED STATES PATENT OFFICE.

ARDON M. MITCHELL, OF TUCKAHOE, NEW YORK, ASSIGNOR TO MITCHELL AND GRENELLE INC., A CORPORATION OF NEW YORK.

INSULATING AND BUILDING MATERIAL AND PROCESS OF MAKING THE SAME.

1,289,862.     Specification of Letters Patent.     Patented Dec. 31, 1918.

No Drawing.     Application filed March 23, 1916.   Serial No. 86,186.

*To all whom it may concern:*

Be it known that I, ARDON M. MITCHELL, a citizen of the United States, residing at Mohegan Heights, Tuckahoe, in the county of Westchester and State of New York, have invented certain new and useful Improvements in Insulating and Building Material and Processes of Making the Same, of which the following is a specification.

This invention relates to certain new and useful improvements in insulating and building material and process of making the same, and it has particular reference to a material especially adapted for insulation, flooring, tiling, shingles and other articles and building material which are subjected to much wear and tear.

For its objects the invention has to provide a material impermeable to moisture, capable of taking on a high polish, containing no constitutional water or water of crystallization, and capable of being sawed, bored, planed and turned into various forms.

Other objects will appear as the description progresses and those salient characteristics on which I desire protection will be succinctly defined in the appended claims.

In carrying the invention into practice, I prefer to use dolomite, consisting of carbonates of calcium and magnesium, $(Ca, Mg)CO_3$, in varying proportions and as free as possible from metallic hydrates and water. This is ground to a very fine powder and heated to a temperature of 220 to 250 degrees F.

I then prepare a quantity of sulfur with approximately two per cent. of paraffin in a closed vessel by heating to a temperature of 220 to 250 degrees. This is added to the powder which is contained within a closed vessel to prevent oxidation while being mixed.

The mass is retained at this temperature (from 220° to 250°) and agitated. It remains in a pulverulent state until desired for use when it is taken out of the first vessel and put in a closed vessel. The temperature is raised to between 650° to 759°, or just below the boiling point of sulfur, and the mass then cast in a mold under pressure sufficient to bring the aggregates close together.

By controlling the heat, a variation in the tint, impermeability to moisture and tensile strength may be obtained while under pressure in the mold.

Admixtures of aggregates that are inert and that contain no moisture, may be added in variable quantities provided the magnesium carbonate constitutes approximately five per cent.

In some instances and especially where the product is desired for purposes other than insulation, pyrites, such as $FeS_2$, may be heated with dolomite, the sulfur in the pyrites making it unnecessary to add an additional quantity of the element although this may be done if the product to be obtained requires it.

Recapitulating, the operations or steps comprise the heating of the pulverized dolomite, or other material carrying magnesium oxid (MgO), thereby to dehydrate the material, to prevent the lowering of the temperature of the sulfur and the hydrocarbon ingredients, when added to the dolomite, and to aid in the disassociation or decomposition of the carbon dioxid from the magnesium carbonate which is the component of the mass reducible by heat alone, to a certain extent, at 465°, to which degree of heat the entire mass is subjected. The purpose of raising the temperature initially is for the diffusion of sulfur while in its most liquid form.

The subsequent raising of the temperature, at the time of casting, is to produce a partial decomposition or disassociation of the carbon dioxid from the magnesium carbonate at 600° which, in the presence of sulfur, reacts to form MgS and tends to maintain the sulfur in an amorphous state to hold those aggregates not chemically affected together.

The product thus obtained is well adapted for use in lieu of concrete, it possessing great strength and durability and will not "flour" by attrition or wear. It contains no constitutional water or water of crystallization, possesses homogeneity throughout and is impermeable to moisture. The electrical resistance is high and the tensile strength approaches two thousand pounds per sq. in. The resulting material may be cast and pressed into any form, while hot, the specific gravity varying according to the admixture and the pressure to which it is submitted. Thus, for a light material the pressure will be light while for a material having a higher specific gravity the pressure will accordingly be heavier. The product is not as frangible as marble and can be sawed, bored, planed and turned in a lathe. The color may be modified from white, yellow and purple, without adding a coloring agent, by varying the time and degree of heat.

It is not affected by hot or cold water, dilute mineral or acetic acid or caustic alkalis; it is not inflammable and hardens with age.

While an excellent material with which to form electric insulators, it is well adapted for use as tiling, flooring, shingles and like articles.

What is claimed is:

1. The process of making an insulating and building material, consisting in pulverizing and heating dolomite to dehydrate the same, adding sulfur in a heated state to the dolomite while the latter is still heated, and casting the mass in a mold under pressure.

2. The process of making an insulating and building material, consisting in pulverizing and heating dolomite to dehydrate the same, and separately heating sulfur with a small degree of paraffin in a closed vessel and adding the same to the dolomite while the latter is still hot.

3. An insulating and building material comprising powdered dolomite united with sulfur and two per cent. of paraffin.

In testimony whereof I affix my signature.

ARDON M. MITCHELL.